No. 846,593.            PATENTED MAR. 12, 1907.
A. MINNE.
LOCK NUT.
APPLICATION FILED JULY 23, 1903.

Witnesses:                Inventor:
                          André Minne,

UNITED STATES PATENT OFFICE.

ANDRÉ MINNE, OF ASNIÈRES, FRANCE.

LOCK-NUT.

No. 846,593. Specification of Letters Patent. Patented March 12, 1907.

Application filed July 23, 1903. Serial No. 166,750.

*To all whom it may concern:*

Be it known that I, ANDRÉ MINNE, a citizen of the French Republic, residing at Asnières, France, have invented a certain new and useful Improved Lock-Nut, of which the following is a specification.

This invention relates to a lock-nut shown, by way of example, in the accompanying drawings.

Figure 1:
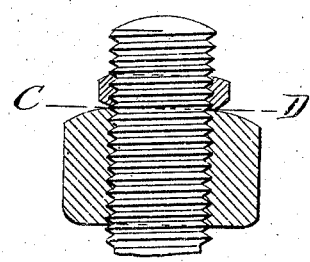
Figure 2:
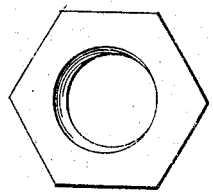
Figure 3:
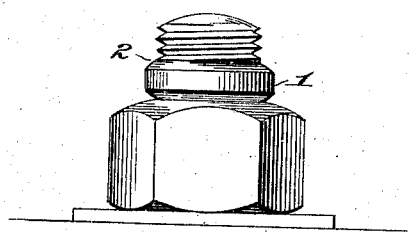

Figure 1 shows an ordinary nut and a lock-nut according to this invention. Fig. 2 is a plan view on the line C D of Fig. 1. Fig. 3 shows in elevation the device shown in Figs. 1 and 2.

In the constructions hitherto known the lock-nut has been always of the same diameter as the nut, and contact takes place along the whole surface of their adjacent faces comprised in the interior of the circle inscribed in the hexagon. This construction has the following drawbacks: The effort in screwing the lock-nut being distributed over a large surface, the useful effort for producing the locking effect is considerably reduced. It frequently happens in practice that there is no locking action. In fact, in case of rough nuts, the faces not being absolutely normal to the axis of the bolt, the contact takes place at a point on the outer circumference. In case of machined nuts it frequently happens that the face presents a concavity, so that the contact also takes place on the outer circumference. Under the circumstances the useful effect of the lock-nut is practically *nil*. Finally, the large contact-surface and the gripping due to the tightening of the lock-nut on the nut cause the two nuts to adhere to each other and to form practically a single nut, which becomes the more easily unscrewed, owing to its increased mass of weight.

The lock-nut according to this invention does away with the above drawbacks. The principles on which it is based are as follows:

First. Reduction to a minimum of the surfaces of contact of the two nuts by forming the two opposed faces or one of them in the shape of a truncated cone of spherical or other surface, so that the small base shall be a circle with a diameter equal to the outside diameter of the screw-thread. The contact then takes place only on the small surface, which in Fig. 2 is shown cross-hatched—that is to say, on the right-hand section of the screw-thread. The advantage of this arrangement is that it multiplies considerably the useful wedging effect at the point of tightening and absolutely prevents any unscrewing action. In case of a tendency of the nut to unscrew the wedging will be even increased.

Second. Reduction to a minimum of the size and diameter of the lock-nut for the purpose of preventing it from obtaining, under the action of vibrations, a momentum capable of overcoming the wedging effort and of becoming unscrewed from the nut. Any vibration of both nuts will communicate in this construction a much greater momentum to the nut, thereby forcing it to engage all the more strongly with the lock nut. It will therefore no longer be necessary to use a cross pin or key, which is practically indispensable in the case of ordinary lock-nuts.

The cylindrical portion 1 of the lock-nut 2, Fig. 3, can be made with flats, or it may be milled, so as to enable a gas-spanner to be used.

In cases where vibration would be sufficient to lengthen the bolt and where, the nut becoming tightened, the lock-nut would be free to unscrew a second lock-nut could be used in front of the first. The two lock-nuts would maintain each other and produce, besides other advantages, the effect of an ordinary lock-nut with pin.

The lock-nut may be made of steel or of any other metal.

The advantages are the same as those of an ordinary lock-nut—*i. e.*, facility of putting in place, compensation of play, and cheapness, owing to its smaller weight and to the suppression of the pin.

What I claim as my invention, and desire to secure by Letters Patent, is—

The lock-nut herein described having the contacting locking-face reduced to a crescent-shaped surface the greatest width of which is equal to the depth of the thread of the bolt.

In testimony whereof I have signed my name to this specification in the presence of two subscribing witnesses.

ANDRÉ MINNE.

Witnesses:
  JEAN ROBELET,
  AUGUSTUS E. INGRAM.